Patented Aug. 26, 1947

2,426,173

UNITED STATES PATENT OFFICE 2,426,173

SELENIUM COATING BY IMMERSION

Mortimer C. Bloom, Newton Highlands, Mass., assignor, by mesne assignments, to Federal Telephone and Radio Corporation, New York, N. Y., a corporation of Delaware No Drawing. Application December 1, 1942, Serial No. 467,561

4 Claims. (Cl. 117—130)

This invention relates to selenium coatings and has for its object to obtain a deposition of metallic selenium on a base element.

It is known that a selenium cell useful for a rectifier or a photo electric effect can be obtained by coating a thin layer of amorphous selenium on a base element, and then converting the selenium of the layer from the amorphous form to the crystalline or metallic form to make it useful in a selenium cell.

Heretofore, various processes have been used for applying the selenium to the base element. For example, a common method is to melt the selenium and spread it over the plate in a thin layer and then allow it to cool and solidify; after which a further heat treatment is required to convert it from the amorphous to the metallic form, as described in Presser Patent No. 1,743,160 for example. Another method which has been used is to vaporize the selenium in an enclosure and sublime it on the base plate. This requires considerable apparatus and involves some difficulties in operation.

In accordance with my invention I obtain a coating of metallic selenium on a base element by treating it with a solution of an alkaline selenide. The selenides of sodium, potassium or ammonia and also of the less common alkali elements, such as lithium, rubidium and caesium may be used, as well as alkaline selenides formed from the alkaline earth group. Solutions of these compounds yield the selenide ion which is apparently the factor in producing the metallic selenium deposit.

Sodium selenide ($Na_2Se$) for the purpose is easily and cheaply obtainable. A suitable sodium selenide solution may be prepared by passing the gas $H_2Se$ through a sodium hydroxide solution, the strength of which may lie within wide limits. For example, a concentration of 100 grams of sodium hydroxide (NaOH) per liter has been found satisfactory, and both half and double this concentration have also been found satisfactory. These concentrations are not critical. There should preferably be used enough of the gas to saturate or nearly saturate the solution. Another way of preparing the solution is to dissolve powdered selenium in the sodium hydroxide.

When the base plate or element is immersed in this solution and then withdrawn, it will be found to be coated with an adherent coating of metallic selenium. The thickness of coatings obtained by this immersion varies with the time of immersion, and a thickness in the order of .0001 inch may be reached. Good adherent coatings are obtained when carbon is used as the base element. The base element selected should preferably be one which is not reactive with selenium.

What is claimed is:

1. The method of coating a carbon base element with metallic selenium which comprises treating the element with an alkaline selenide solution.

2. The method of coating a carbon base element with metallic selenium which comprises treating the element with a sodium selenide solution.

3. The method of coating a carbon base element with metallic selenium which comprises treating the element with a potassium selenide solution.

4. The method of coating a carbon base element with metallic selenium which comprises treating the element with an ammonium selenide solution.

MORTIMER C. BLOOM.

REFERENCES CITED

The following references are of record in the file of this patent:

UNITED STATES PATENTS

| Number | Name | Date |
|---|---|---|
| 1,961,030 | Bengough | May 29, 1934 |
| 2,266,377 | Neely | Dec. 16, 1941 |